Jan. 1, 1963 L. K. LOEHR 3,071,366
SPRING SUSPENSION SYSTEM FOR LOAD-CARRYING VEHICLES
Filed June 18, 1956 3 Sheets-Sheet 1
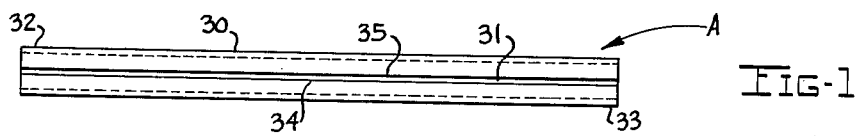
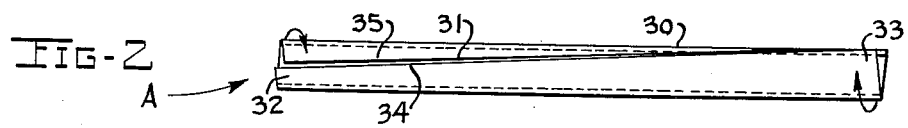
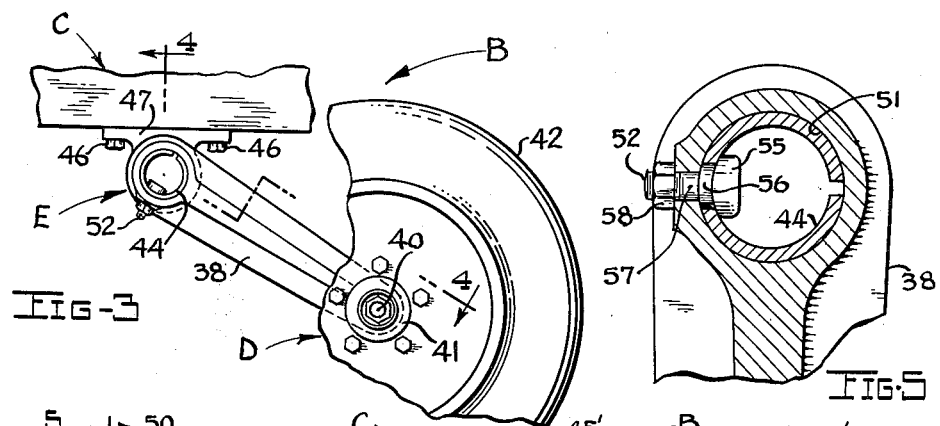
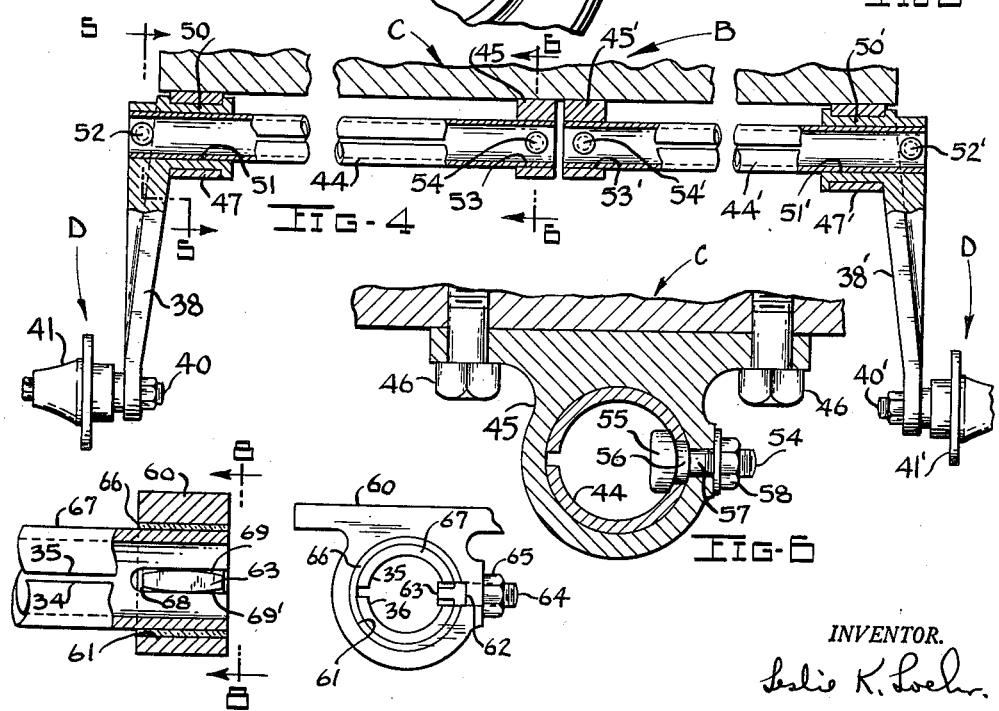
INVENTOR.
Leslie K. Loehr

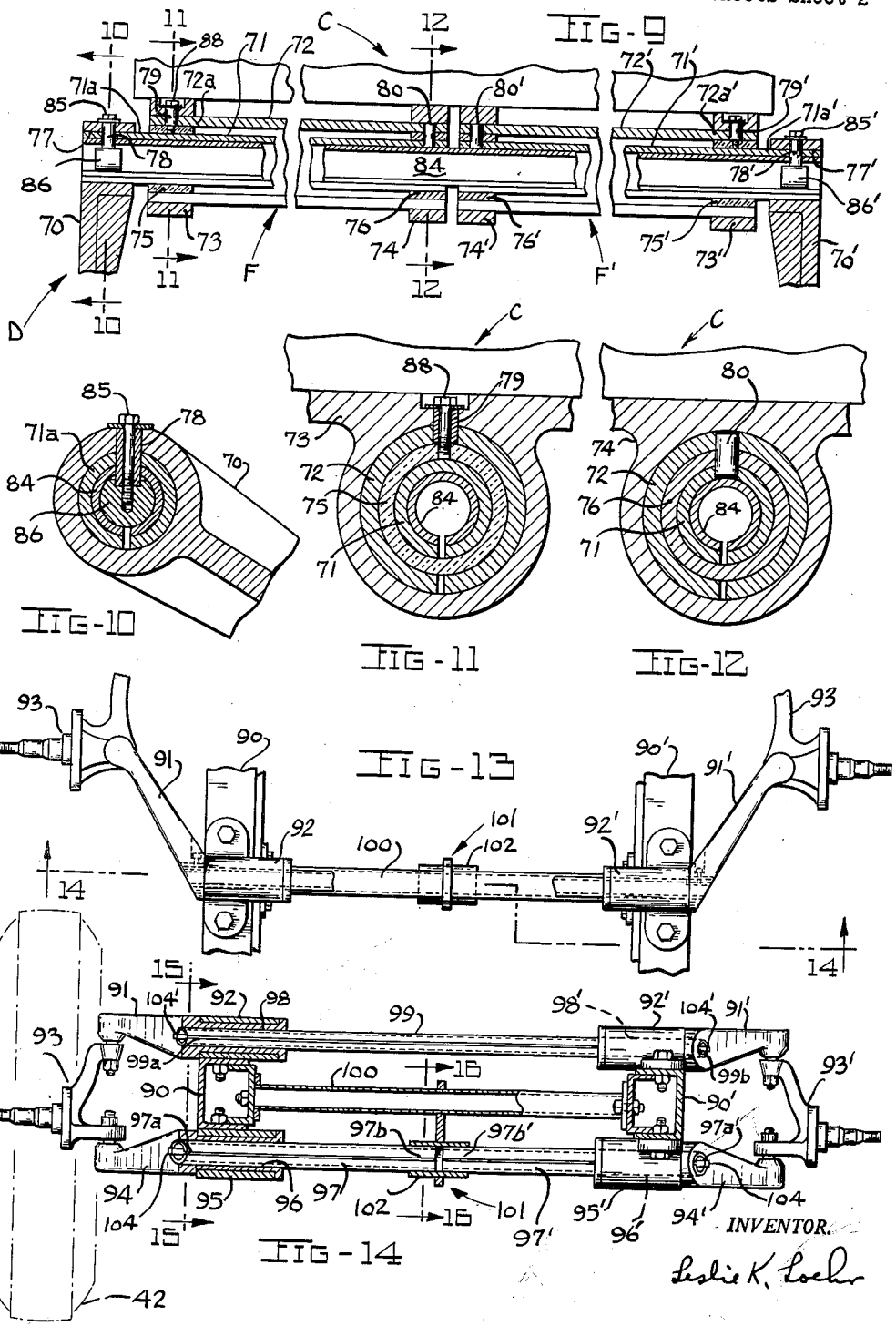

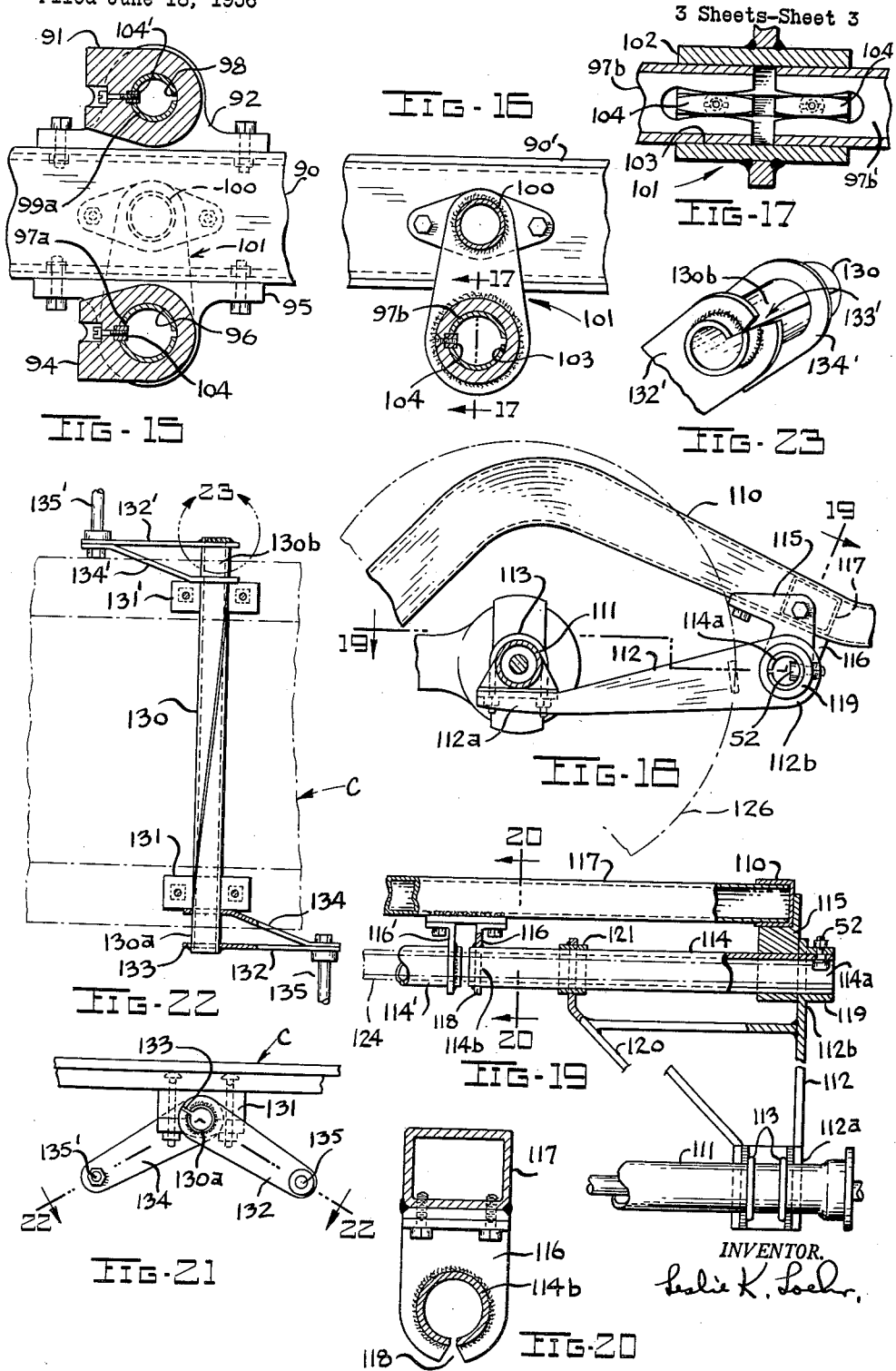

ized Patent Office 3,071,366
Patented Jan. 1, 1963

3,071,366
SPRING SUSPENSION SYSTEM FOR LOAD-
CARRYING VEHICLES
Leslie K. Loehr, 10584 Dunleer Drive, Los Angeles, Calif.
Filed June 18, 1956, Ser. No. 591,989
2 Claims. (Cl. 267—57)

This invention relates to spring suspension systems for wheeled vehicles and, more particularly, to such systems wherein the desired spring effect is obtained from elongated elements designed for resilient torsional flexure about a longitudinal axis.

In prior art torsion spring suspension systems, it is common practice to employ straight solid bars or tubes with solid walls arranged such that the spring-borne load applies torsional forces to these elements. To provide torsionally resilient elements of this character having sufficient deflective ability and a reasonable measure of transverse strength, the bars or tubes comprising such elements are usually too long for practicable design purposes; hence, torsion springs for wheeled vehicles have not been generally accepted.

The present invention contemplates a torsion spring suspension system in which the torsion spring elements, tube-like in appearances, are so constructed as to provide torsion springs of acceptable length with adequate flexibility and load-carrying qualities to meet a wide range of design conditions.

This invention is based on the fact that the torsional flexibility of a tube having a solid wall is increased considerably if the solid wall on one side of the tube is longitudinally severed throughout its length to provide disconnected edges separated by a gap, and the ends of the tube are supported such that the wall of the tube can warp helically without changing the diameter of the tube ends and without rubbing contact between the disconnected edges, that is, the disconnected edges of the tube wall can move longitudinally with respect to each other relative to the axis of the tube when twisting forces are applied axially to the tube.

Accordingly, it is an object of this invention to provide a spring suspension system for wheeled vehicles in which the spring elements are torsion springs each comprising a straight tube with substantially uniform diameters having its wall longitudinally severed or split on one side throughout its length.

It is another object to provide such a spring suspension system in which the torsion springs, constructed of spring material, are formed as a tube having a perimetric wall parted to provide a pair of disconnected edges separated by a gap throughout the length of the tube.

It is a further object to provide such a system wherein the split-walled tube is associated with the vehicle so that twisting forces are applied to the tube substantially at right angles to the axis thereof, and wherein the apparatus employed for supporting the tube and applying the twisting forces thereto are constructed such as to prevent radial displacement of the tube and in the axial locations where the twisting forces are applied, and such that optimum relative movement of the opposing edges of the tube wall adjacent the split is made possible for effecting optimum helical warping of the tube throughout its length in response and proportion to the magnitude of the twisting forces applied.

It is also an object to provide a spring suspension system for wheeled vehicles in which the torsion spring comprises a plurality of telescoped or coextensive tubular elements, each with a longitudinally split wall, which elements are seriately connected such that optimum torsional deflection is attained with respect to the extreme ends of the spring when twisting forces are applied thereto, and to provide such a system with apparatus for applying the twisting forces so as to allow the telescoped tubular elements to warp helically and provide optimum torsional deflection.

It is another object to provide a wheel suspension system particularly adapted for use in connection with the wheel and load-carrying structures of a motor vehicle, which employs a spring comprising a torsionally-flexible split-walled tube of substantially uniform diametral cross section, and apparatus for applying torsional forces to the ends of the tube such as to effect a uniform helically warped condition of said tube throughout the over-all length thereof.

It is a further object to provide such a wheel suspension system which is particularly adaptable for use as an independent-type front wheel suspension system for automobiles, and to provide a system of this character with a built-in stabilizer that forms a structural part of the apparatus comprising the system, which stabilizer includes a torsionally-flexible split-walled tube arranged such as to not only support the front wheels, but to also provide equalizing forces for effecting road stability.

Another feature of this invention resides in the provision of a spring suspension system having a torsion spring constructed such that allowable torsional deflection is increased considerably without effecting a corresponding decrease in the transverse strength thereof, and to provide such a torsion spring which can also be employed as a structural member subject to transverse loads without affecting the torsional flexibility of the spring.

The novel features of this invention, together with further objects and advantages thereof, will be better understood from the following description considered in connection with the accompanying drawings in which embodiments of the invention are illustrated by way of example. It is to be expressly understood, however, that the drawings are for the purpose of illustration and description only, and are not intended as a definition of the limits of the invention.

In the drawings:

FIG. 1 is plan view of a split tube spring element;
FIG. 2, similar to FIG. 1, illustrates the tubular element in a torsionally twisted or warped condition;
FIG. 3 is a fragmentary side view of a wheeled vehicle embodying this invention;
FIG. 4 is a sectional view taken on line 4—4 of FIG. 3;
FIG. 5 is a sectional view taken on line 5—5 of FIG. 4;
FIG. 6 is a sectional view taken on line 6—6 of FIG. 4;
FIG. 7 is a sectional view of a modification of the structure shown in FIG. 6;
FIG. 8 is an end view taken on line 8—8 of FIG. 7;
FIG. 9 is a sectional fragmentary view of another embodiment applied to a vehicle of the character shown in FIG. 3;
FIG. 10 is a sectional view taken on line 10—10 of FIG. 9;
FIG. 11 is a sectional view taken on line 11—11 of FIG. 9;
FIG. 12 is a sectional view taken on line 12—12 of FIG. 9;
FIG. 13 is a plan view of a front wheel suspension for a motor vehicle embodying this invention;
FIG. 14 is a combination sectional and elevational view taken on line 14—14 of FIG. 13;
FIG. 15 is a combination sectional and elevational view taken on line 15—15 of FIG. 14;
FIG. 16 is another combination sectional and elevational view taken on line 16—16 of FIG. 14;
FIG. 17 is a sectional view taken on line 17—17 of FIG. 16;

FIG. 18 is a fragmentary end view of a rear wheel suspension system for a motor vehicle embodying this invention;

FIG. 19 is a combination sectional and plan view taken on line 19—19 of FIG. 18;

FIG. 20 is a sectional view taken on line 20—20 of FIG. 19;

FIG. 21 is an end view of another embodiment of this invention;

FIG. 22 is a combination sectional and plan view taken on line 22—22 of FIG. 21; and FIG. 23 is an oblique view taken as indicated by line 23 in FIG. 22.

The flexible resilient portion of the spring suspension system of this invention is illustrated generally in FIGS. 1 and 2 of which FIG. 1 shows a tubular element A having a generally cylindrical perimetric wall 30 of substantially uniform outside diameter longitudinally split or severed by a slot 31 such that wall 30 is circumferentially discontinuous throughout its length. This construction is effected by cutting slot 31 the full length of a solid-walled cylindrical tube or by rolling a rectangular piece of material into a cylindrical tube such that the long edges of the rectangle are positioned in parallel adjacency such as to form slot 31. Now, if clockwise twisting forces of sufficient magnitude are applied to the ends 32 and 33 of element A as indicated by the arrows in FIG. 2, and if the means for applying these forces are adapted to engage the element ends such as to allow relative movement between the noncontiguous slot-bordering edges 34 and 35 of wall 30 throughout the length of slot 31, then element A will assume the physical appearance shown in FIG. 2, wherein slit 31 becomes a definition of the helically warped or twisted condition of the element; on the other hand, if element A is constructed with an original form of the character illustrated in FIG. 2, then the application of counterclockwise twisting forces applied to ends 32 and 33 will cause element A to assume the appearance shown in FIG. 1. In either case, it is most important that the noncontiguous edges of the wall of the split tube be allowed to move axially of the tube relative to each other but without rubbing contact throughout their full unconnected relationship, and that the means applying the twisting forces to element A be constructed to implement or further such movement without radial deformation of the tube wall in the axial locations where the forces are applied; in other words, the means employed to twist element A should be characterized by its ability to fully accommodate the required axial movement of the element wall and, at the same time, preclude radial movement thereof to attain the desired helical warping of all portions of the element according to the twisting forces applied.

In light of the illustrations in FIGS. 1 and 2, where noncontiguous edges 34 and 35 of wall 30 are shown in the same curved plane, it is apparent that torsional flexibility of equivalent character will be attained from an element wherein edges 34 and 35 lie in overlapped relationship or are otherwise positioned in different but substantially parallel planes.

In FIGS. 3 and 4 reference letter B indicates a vehicle having a load-carrying portion or structure schematically illustrated and generally identified by reference letter C, and a wheel portion or structure D comprising load arms 38 and 38' provided with wheel spindles 40 and 40' equipped with wheel hubs 41 and 41' each adapted to receive a wheel of the character of wheel 42, shown in FIG. 3. Interconnecting the wheel and load-carrying structure, such that load-carrying structure C is resiliently supported by wheel structure D, is a spring suspension system E embodying split tubular elements 44 and 44' constructed of spring material and having structural and functional characteristics similar to flexible resilient element A previously described in connection with FIGS. 1 and 2.

As indicated in FIGS. 3 and 4, elements 44 and 44' are supported relative to the vehicle in end-to-end relationship with respect to each other by anchor brackets 45 and 45' attached to load-carrying structures C with bolts 46 (FIG. 6), and by means of bearing brackets 47 and 47' rotatably connecting load arms 38 and 38' to the load-carrying structure, which bearing brackets are also attached to said structure by bolts 46 (FIG. 3). It is to be noted that the ends of arms 38 and 38' which are rotatably connected to the load-carrying structure, not only include cylindrical portions 50 and 50' (FIG. 4) adapted to rotatively engage bores of bearing brackets 47 and 47' for effecting the rotatable connection, but they also include bores 51 and 51' adapted to slidably engage respective ends of split tubular elements 44 and 44', and drive pins 52 and 52' which drivingly engage the elements by means of a radial opening through each element wall diametrically opposite the slot therein, clearly indicated by FIG. 5. It is also to be noted that anchor brackets 45 and 45' similarly engage the other ends of elements 44 and 44', that is, the anchor brackets are provided with bores 53 and 53' respectively conditioned to slidably engage an end of each element (see FIG. 4), and with anchor pins 54 and 54' each extending through a radial opening in its respective element wall diametrically opposite the slit therein, as evidenced by FIG. 6.

FIGS. 5 and 6 indicate respectively the structural characteristics of the drive and anchor pins and the similarity therebetween. As shown, each pin includes a head portion 55, a shoulder portion 56, and a threaded shank 57. The head and shoulder portions are conditioned to agree with the cylindrical structure of the split tubular element, while the shoulder portion is further conditioned to not only fit the radial openings in the walls of the elements, but to have a width slightly exceeding the wall thickness of the elements adjacent the openings; thus threaded shank 57, adapted to fit radial openings in the bores of the load arms and anchor brackets, becomes effective by means of a nut 58 to securely hold shoulder portion 56 against the surfaces of the bracket and load arm bores.

It was previously stated that respective ends of tubular elements 44 and 44' are slidably engaged with bores 51 and 51' of load arms 38 and 38', and that the other ends of the split tubular elements are respectively conditioned to slidably engage bores 53 and 53' in anchor brackets 45 and 45'. Because of these slidable engagements and the above described functions of the drive and anchor pins, load arms 38—38' and anchor brackets 45—45' are effective for applying twisting or torsional forces to split tubular elements 44 and 44' such that radial expansion or spreading of the walls of the elements is prevented in the regions where said forces are applied so as to produce helical warping of the tubular elements in proportion to the magnitude of such forces, which warping is accompanied by proportional relative movement between those portions of the walls of the elements adjacent the slots in the walls, as described in connection with FIGS. 1 and 2.

Now, since anchor brackets 45—45' and bearing brackets 47—47' are attached to load-carrying structure C, and since load arms 38—38' are not only provided with wheels but are also rotatively connected to the load-carrying structure; then the functions of the drive and anchor pins are to mechanically connect split tubular elements 44—44' between wheel structure D and load-carrying structure C so that the weight of the load-carrying structure is transmitted to the wheel structure as torsional forces applied to the ends of the split tubular elements. Moreover, the means employed to apply the torsional forces to elements 44 and 44' not only resist radial expansion of the walls of the elements, but they accommodate without restricting the required axial movement of said walls to attain the desired helical warping of these elements according to the weight of the load-carrying structure; hence, the structural requirements to achieve optimum torsional flexibility of split tubular elements 44—44', as set forth in the description of FIGS. 1 and 2, are present in spring suspension system E.

In FIGS. 7 and 8, reference numeral 60 indicates an anchor bracket similar in functional character to brackets 45—45' of FIGS. 4 and 6. Anchor bracket 60 is provided with a bore 61 having a keyway 62 with a key 63 secured therein by suitable means such as a threaded shank 64 fixed to the key and a nut 65. Bore 61 is fitted with a bushing 66 adapted to slidably receive the end of a split tubular element 67 similar to element 44 except that the radial opening in the end of element 67 comprises a key slot 68 cut through the wall of element 67 diametrically opposite the unconnected wall edges 34 and 35. Key 63 is provided with opposing convexly curved surfaces 69 and 69', as shown in FIG. 7, for engagement with the sides of slot 68. The maximum width of key 63 between the curved surfaces being slightly less than the width of key slot 68 to allow the wall of the tubular element to warp without spreading the key slot, or the sides of the key slot may be curved as shown in FIG. 17, hereinafter described. While bushing 66 is drawn to indicate a metal bushing, preferably of the self-lubricating type, it can be made of rubber or plastic material having suitable characteristics to provide anchor bracket 60 with the ability to afford the optimum helical warping of the tubular element wall and, at the same time, preclude radial expansion thereof.

The structure illustrated in FIG. 9, similar in many respects to the structure above described in connection with FIGS. 3 through 6, is representative of a vehicle having a load-carrying structure C, schematically shown, and a wheel structure D represented by the fragmentary showing of load arms 70 and 70' which, it should be understood, are intended to include spindles, hubs, and wheels installed similarly to those employed in the case of load arms 38—38' of FIGS. 3 and 4. Interconnecting the wheel and load-carrying structures, such that the load-carrying structure C is resiliently supported by the wheel structure D, is a spring suspension system embodying identical springs F and F' respectively comprised of split tubular elements 71—72 and 71'—72' constructed of spring material and provided with structural and functional characteristics similar to flexible resilient element A shown in FIGS. 1 and 2. Moreover, the springs F and F' are supported relative to the vehicle in axially-aligned end-to-end relationship with respect to each other by anchor brackets 73—73' and steady brackets 74—74' attached to load-carrying structure C by suitable means (not shown), such as bolts 46 FIGS. 3 and 6.

The adaptability of torsionally deflectable springs of the character of element A (FIGS. 1 and 2), to meet various design requirements, is evidenced by the fact that split tubular elements 71—71' are telescopically assembled and seriately connected with split tubular elements 72—72', respectively, to provide compound springs F and F' with torsional deflective capacities of single split tubes having much greater length. As indicated in FIG. 9, elements 71—72 and 71'—72' of springs F and F' are coextensively arranged about common axes with the walls of the elements in spaced radial relationship maintained by bushings 75—75' and 76—76' positioned at the ends of the springs in the manner shown, and with the slots in the walls of the elements radially aligned according to the sectional views of FIGS. 11 and 12.

As seen in FIG. 9, split tubular elements 71—71' are dimensioned such that the lengths thereof exceed the lengths of elements 72—72' to provide projecting end portions 71a—71a' of the elements 71—71', which end portions are adapted to be slidably received by bores 77—77' formed in load arms 70—70' and drivenly connected to said load arms by drive pins 78—78' hereinafter described. Moreover, ends 72a and 72a' of elements 72—72', spaced radially from elements 71—71' by bushings 75—75', are slidably received by bores provided in anchor brackets 73—73', and include radial openings receiving anchor pins 79—79' so as to constitute means whereby the anchor brackets become effective mediums for applying twisting forces to ends 72a—72a' of compound springs F and F'. The series connections of split tubular elements 71—72 and 71'—72' are achieved at the ends of springs F and F', supported with steady brackets 74—74', by means of pins 80—80' which extend radially through the wall of bushing 76—76' into radial openings in the walls of elements 71—72 and 71'—72', clearly indicated in FIG. 12. Since the function of steady brackets 74—74' is to maintain the springs in axial alignment, the bores in these brackets are conditioned to slidably receive the ends of split tubular elements 72 and 72' such as to allow these ends of the springs to assume their normal positions resulting from torsional deflections of the springs. These same conditions prevail with respect to bushings 76—76', that is, the relationships between these bushings and the ends of elements 71—72 and 71'—72' are such as to allow said ends to assume normal warped positions in response to torsional deflections of the springs.

From the foregoing description of compound springs F—F' and their structural relationships with load arms 70—70' and anchor brackets 73—73', it is apparent that projecting end portions 71a—71a' of split tubular elements 71—71' and the ends 72a—72a' of split tubular elements 72—72' provide compound springs F—F' with means for effecting a mechanical connection between the wheel and load-carrying structures such that the supporting action of the wheel structure produces forces which operate to twist the springs. In this connection, attention is directed to the fact that bushings 75—75' not only maintain the spaced relationship of the split tubular elements while permitting relative rotation therebetween, but they also act to transmit the weight of the load-carrying structure to the wheels through split tubular elements 71—71'. In other words elements 71—71' are subjected to transverse loads or forces produced by the weight of the load-carrying structure. This is a distinct and important advantage resulting from the fact that the torsional deflective characteristics of a split tubular element are not attributed to its transverse strength; hence, split tubular elements are adaptable for use as a combination spring and structural member capable of torsional deflection under transverse loads when such elements are supported according to the several figures of the drawings.

FIG. 9 also illustrates an important structural feature resulting from the tubular construction of compound springs F—F' and their axially aligned relationship, which feature comprises an equalizer 84 extending through split tubular elements 71—71' connected thereto at ends 71a—71a' and to load arms 70—70' by means of the drive pins 78—78' as shown in FIGS. 9 and 10. Equalizer 84 is a tubular member with a longitudinally split wall made of spring material, having the same structural and functional attributes of element A, FIGS. 1 and 2. The purpose of equalizer 84 is to apply torsional forces to compound springs F and F' tending to equalize the torsional deflections of the springs under conditions of sway, that is, when the torsional deflection of one of the springs exceeds the torsional deflection of the other spring, because of swaying tendencies of the load-carrying structure with respect to the wheel structure, equalizer 84 becomes effective as means to not only increase the load-carrying capacity of the spring undergoing the greater deflection, but it achieves this increase by applying forces tending to cause a corresponding deflection in the other spring.

To effect the connections of equalizer 84 to compound springs F—F' and arms 70—70', each end of the equalizer is provided with a radial opening in the wall thereof such that upon assembly with an arm and a spring, as shown in FIG. 10, the openings in the arm, spring, and equalizer end are aligned to receive a pin 78 or 78' which is provided with a central bore to receive a cap screw 85 in threaded engagement with an alignment member 86. Attention is directed to the fact that the inner end of pin 78 is received by a counterbore in alignment member 86 which member is fitted closely to the inner surface of the equalizer wall; thus, any tendency of pin 78 to change its radial position as a result of torsional forces applied to the tubular spring or equalizer is met with resistance afforded by the alignment member and the tube walls.

It is to be noted that anchor pins 79—79' are similar in construction to pin 78, that is, pins 79—79' are respectively provided with a central bore to receive a cap screw 88 in threaded engagement with a threaded hole in the wall of respective bushings 75—75' as indicated in FIG. 11. The engagement between cap screw 88 and each bushing serves to hold each bushing in position.

In light of the foregoing description of FIGS. 9 through 12, it is seen that the structure disclosed provides a spring suspension system for wheels of a vehicle, employing compound springs each constructed of split-walled tubular elements telescoped one within another and connected in series such that optimum torsional deflection is attained at the free ends of the seriately connected elements when twisting forces are applied at the free ends; furthermore, the structure provides a split-walled tube functioning as an equalizer between corresponding ends of the springs, tending to provide equality in deflection magnitudes between the springs employed.

A spring suspension system particularly adaptable for front-end use in motor vehicles is illustrated in FIGS. 13 and 14, where reference numerals 90—90' indicate side members of a motor vehicle frame. Loads arms 91—91' journaled in bearings 92—92' mounted on the top of side members 90—90', are adapted to support the upper ends of spindle assemblies 93—93' each of which is constructed to receive a wheel 42 shown in dotted outline over spindle assembly 93; while load arms 94—94' journaled in bearings 95—95' mounted on the bottom of side members 90—90', are adapted to support the lower ends of spindle assemblies 93—93'. Bores 96—96' provided through the journal-portions of arms 94—94' are conditioned to slidably receive ends 97a—97a' of split tubular springs 97—97' which are similar in structure and in functional character to split tubular elements 44—44' described in connection with FIGS. 3 through 6. Ends 97b—97b' of split tubular springs 97—97' are anchored to frame members 90—90' by an anchor assembly comprising a bar 100 having its ends respectively attached to the frame members, and an anchor bracket 101 depending from the medial portion of the bar, which anchor bracket is provided with a sleeve 102 having a bore 103 fitted with keys 104 as shown in FIGS. 16 and 17. The ends 97b and 97b' being slidably received by bore 103 are also provided with key slots having convexly curved sides adapted to engage the convexly curved sides of keys 104 for providing torque-transmitting mechanical connections between these ends of springs 97—97' and the frame or load-carrying structure of motor vehicle.

In addition to slidably receiving ends 97a—97a' of the split tubular springs, bores 96—96' in the journal-portion of load arms 94—94' are also provided with keys 104 in driving engagement with key slots in the ends of the springs, which keys and key slots are constructed according to the keys and key slots illustrated in FIG. 17. Thus, load arms 94—94' are connected to ends 97a—97a' of springs 97—97' such as to apply twisting or torsional forces to the springs. In other words, because of the function of the anchor assembly and the journal-portion of the load arm, split tubular springs 97—97' are supported relative to the vehicle and connected to the wheel and load-carrying structure such that the supporting action of the wheel structure with respect to the load-carrying structure is effective for applying twisting forces to the split tubular springs. Moreover, because of the key and key-slot structural characteristics and the slidable relationship with the load arm bores and the anchor assembly sleeve bore, the ends of the springs are conditioned to assume helically warped attitudes proportional to the magnitudes of the twisting forces applied by the supporting action of the wheel structure.

It is to be noted that the journal-portions of load arms 91—91' are provided with bores 98—98' which are conditioned to slidably receive ends 99a and 99b of an equalizer 99 comprising a split-walled tubular member, made of spring material, having the same structural and functional characteristics of equalizer 84 and element A previously described. Force-transmitting connections between load arms 91—91' and equalizer 99 are provided by keys 104' fitted to keyways in bores 98—98', and by key slots in ends 99a—99b of the equalizer. Both keys and the key slots are constructed according to the structure shown in FIG. 17, that is, each of the keys 104' is similar in design to key 104, and the key slots in the ends of equalizer 99 are similar in design to the key slots in ends 97b—97b' of springs 97 and 97'. As a result of the force-transmitting connections between load arms 91—91' and the ends of equalizer 99, unequal torsional deflections of springs 97—97' provide the equalizer with forces tending to correct this unequal condition, as described in connection with equalizer 84 in FIG. 9.

A spring suspension system particularly adaptable for connecting the rear wheel structure to the load-carrying structure of a motor vehicle, is schematically represented by FIGS. 18 and 19, wherein reference numeral 110 identifies the left-rear side of a load-carrying motor vehicle frame connected to the left-hand side of rear axle housing 111 by a load arm 112 having an end 112a secured to the axle housing with U bolts 113 and the other end 112b connected to end 114a of a split tubular spring 114 supported on the vehicle frame by a bearing bracket 115 attached to the left frame side member 110 and by an anchor bracket 116 attached to a frame cross member 117 extending transversely of the vehicle between the side members of the vehicle frame. Bearing bracket 115 is provided with a bore conditioned to slidably receive end 114a such as to provide a rotatable connection between load arm end 112b and frame member 110 such as to allow helical warping of the split wall of the spring.

A unique feature of the structure shown in FIGS. 18 and 19 resides in the fact that anchor bracket 116 is constructed of flat relatively thin material and is welded to end 114b of split tubular spring 114 so as to constitute a thin radially extending flange as indicated in FIGS. 19 and 20; hence, the helical warping of the end of spring and the relative movement between the unconnected edges of the tubular spring wall result not from the sliding relationship of the spring in the anchor bracket bore, but instead, they result from the fact that the wall surrounding the bore is split or provided with a gap 118 (FIG. 20) aligned with the slit in the wall of the spring, and from the fact that the bracket being relatively thin as shown is adapted for flexing with the spring wall in a manner similar to the showing in FIG. 23.

End 112b of load arm 112 is provided with a portion 119 having a bore conditioned to slidably receive end 114a of spring 114, and a drive pin 52 extending through a radial opening in end 114a diametrically opposite the slot in the wall of the spring. Drive pin 52 is clearly shown in FIG. 5 and fully described in connection with the spring suspension system of FIGS. 3 and 4.

A stabilizer 120 having a sleeve 121 rotatively engaging spring 114 intermediate the ends thereof extends angularly to end 112a of the load arm for effecting a joint connection therewith to axle housing 111, as shown in FIG. 19. The purpose of stabilizer 120 is to provide the spring and load arm with means for counteracting lateral movement of the vehicle frame with respect to the rear axle housing. In this connection, it is to be noted that spring 114 becomes a structural member subject to transverse loads resulting from forces applied by the stabilizer. Attention is also directed to the fact that end 114a is subject to transverse loads resulting from the weight of the load-carrying portion of the vehicle.

In view of the fact that FIGS. 18 through 20 and the explanations thereof are confined to the left-hand side of the rear-wheel spring suspension system, it is to be understood that the right-hand side of the system is a right-hand version of the structures disclosed; this fact is evidenced by reference numerals 114' and 116' which identify a right-hand spring and anchor bracket, respectively. A distinct advantage of the duplicate characteristics of the left and right-hand versions of the structures comprising the system resides in the fact that an equalizer 124, similar to previously described equalizers 84 and 99, can be easily installed, as suggested by dot-and-dash lines in FIG. 19, to produce forces tending to equalize unequal deflections of left and right-hand springs 114—114'.

The operation of the system shown in FIGS. 18 through 20 and described above is similar to the systems previously described except that the springs in the present system are subject to different loadings, that is, axle housing 111 and left and right-hand wheels schematically represented by circular dot-and-dash line 126 comprise a wheel structure that is connected to load-carrying frame 110 of a motor vehicle by split tubular springs 114—114' which are not only subjected to twisting forces applied such that the springs warp helically throughout their lengths in proportion to the magnitude of the twisting forces, but they are also subjected to transverse forces resulting from counteraction preventing relative lateral movement between the wheel structure and the load-carrying vehicle frame, and to transverse forces resulting directly from the weight of the vehicle frame and the load carried thereby.

FIGS. 21 and 22 disclose a spring suspension system in which a split tubular spring 130, similar in structural and functional character to element A of FIGS. 1 and 2, is rotatively supported on a load-carrying structure C by bearing blocks 131—131' such that spring 130 is free to assume changes in its helically-warped condition according to twisting forces applied by load arms 132—132' having end portions respectively welded to ends 130a—130b of the spring. To achieve these connections, the ends of the arms are bored to fit the spring, and the walls of the bores are split to provide gaps 133—133' aligned with the slot in the wall of the spring before the welds are made. Load arms 132—132' are provided with lateral bracing effected by members 134—134' connected respectively to the free ends of the arms by the same means securing wheel spindles 135—135' to the arms. The bracing members extend angularly from their connections with the load arms to rotative engagements with ends 130a—130b of the spring, which engagements are axially spaced from the welded connections of the load arms, as seen in FIG. 22.

In this system, neither end of spring 130 is anchored to the load-carrying structure, instead, the whole spring is supported in a freely rotatable condition by the bearing blocks; hence, the load arms, extending radially from the ends of the spring in generally opposite directions from the axis thereof, apply opposing twisting forces to the spring ends according to weights resulting from the load-carrying structure. In view of this arrangement, the wheel and load-carrying structures are interconnected by split tubular spring 130 such that the supporting action of the wheel structure applies twisting forces to the ends of the spring.

The welded connections between respective ends of load arms 132—132' and spring ends 130a—130b are similar to the connections between anchor brackets 116—116' and the respective ends of springs 114—114' (FIGS. 19-20). The load arms previously described in connection with FIGS. 3 through 19, have been constructed to provide for torsional warping of the spring ends involved by conditioning the bores in the arms to slidably receive the ends of the springs. In the case of spring 130, while the ends thereof are free to rotate with respect to the bracing members 134—134', they are not free to slide with respect to load arms 132—132' because of the welded relationship between the arms and ends 130a—130b of the spring; therefore, helical warping of the ends of the spring and the relative movement between the unconnected edges of the tubular spring wall result from the fact that the walls surrounding the bores in the ends of the arms are severed by gaps aligned with the slot in the spring wall so as to afford the required axial movement of the split tubular wall of the spring and attain helical warping proportional to the twisting forces applied by the load arms. In other words, the severed walls surrounding the bores in the ends of the load arms are constructed of relatively thin material to provide ability to warp in agreement with the wall of the split tubular spring to which they are welded and at the same time prevent radial expansion or spreading of the walls of the spring, as shown in FIG. 23.

It has been shown that split-walled tubular elements, constructed of spring material, can be employed as torsion springs in wheel suspension systems for wheeled vehicles when these elements are supported and applied with twisting forces such that the unconnected edges of the split tubular walls can move axially, but not radially, to effect helically warped conditions of the elements proportional to the twisting forces applied; that springs of this character, supported and applied with forces as stated, can be subjected to transverse loads without affecting their deflective ability; and that several such springs coextending in telescoped relationship can be supported and applied with twisting forces such as to provide an accumulation of their separate mechanical properties. Thus, the present invention provides spring suspension systems having wide ranges of design flexibility to meet wide ranges of design requirements in the many different types of vehicles employing wheels in the duel capacity of weight supports and instrumentalities of mobility, and to provide such systems wherein the springs are capable of coextensive assembly about common axes such that deflective or load-carrying capacities of the springs are cumulative according to the elements comprising the springs and equalizer of FIG. 9.

What is claimed as new is:

1. In a spring suspension system, a torsionally deflectable tubular element having a longitudinal axis and a generally cylindrical wall separated by a single slot providing spaced unconnected wall portions extending axially of said tubular element from end to end; first means circumferentially contacting the ends of the tubular element for precluding radial displacement of the spaced unconnected portions of the generally cylindrical wall and accommodating axial displacement of said wall portions when said tubular element is torsionally deflected, said first means including cylindrical surfaces extending axially of said tubular element in slidable contact with cylindrical surfaces of said generally cylindrical wall in the end regions of said tubular element; and second means interconnecting the generally cylindrical wall and said first means in force-transmitting relationship for applying forces to said cylindrical wall such as to cause torsional deflection of said tubular element without restricting axial displacement of the spaced unconnected wall portions during such torsional deflection; said generally cylindrical wall and said slot being respectively provided with substantially uniform diameters and with a width throughout the tubular element length such that torsional deflection of the tubular element caused by said first and second means occurs throughout the length of said tubular element without contact between the unconnected wall portions.

2. In a spring suspension system, a torsionally deflectable tubular element having a longitudinal axis and a generally cylindrical wall of substantially uniform diameters throughout the tubular element length, said generally cylindrical wall being made structurally discontinuous by a single slot providing spaced unconnected wall portions extending axially of said tubular element from end to end; first means circumferentially contacting the ends of the tubular element for precluding radial displacement of the spaced unconnected portions of the generally cylindrical wall and accommodating axial displacement of said wall portions when said tubular element is torsionally deflected, said first means comprising members having cylindrical surfaces extending axially of said tubular element in slidable contact with internal and external cylindrical surfaces of said generally cylindrical wall at the ends of said tubular element; and second means interconnecting the generally cylindrical wall and the members comprising said first means in force-transmitting relationship for applying forces to said cylindrical wall such as to cause torsional deflection of said tubular element without restricting axial displacement of the spaced unconnected wall portions during each torsional deflections; said slot being of a width such that torsional deflection of the tubular element caused by said first and second means is effected without contact between the spaced unconnected portions of the generally cylindrical wall.

References Cited in the file of this patent

UNITED STATES PATENTS

| | | |
|---|---|---|
| 2,016,753 | Patzig | Oct. 8, 1935 |
| 2,734,742 | Schwenk | Feb. 14, 1956 |
| 2,741,493 | Matthias | Apr. 10, 1956 |
| 2,787,460 | Chiabrandy et al. | Apr. 2, 1957 |

FOREIGN PATENTS

| | | |
|---|---|---|
| 649,223 | Germany | Aug. 18, 1937 |
| 749,208 | Germany | Nov. 17, 1944 |
| 868,537 | Germany | Feb. 26, 1953 |
| 872,258 | France | May 17, 1941 |